United States Patent [19]

Thomas

[11] 4,103,923
[45] Aug. 1, 1978

[54] BICYCLE HOLDER

[76] Inventor: Marion V. Thomas, 545 Thornwood Dr., Baton Rouge, La. 70806

[21] Appl. No.: 765,760

[22] Filed: Jan. 26, 1977

[51] Int. Cl.² .............................................. B62H 5/00
[52] U.S. Cl. ................................ 280/289 L; 280/298
[58] Field of Search .......... 280/289 L, 289 R, 289 A, 280/203, 209, 293, 295, 297, 298, 301, 7.16

[56] References Cited

U.S. PATENT DOCUMENTS

| 563,570 | 7/1896 | Covert | 280/298 |
| 608,543 | 8/1898 | Breithut | 280/301 |

Primary Examiner—Joseph F. Peters, Jr.
Assistant Examiner—Donn McGiehan
Attorney, Agent, or Firm—Clarence A. O'Brien; Harvey B. Jacobson

[57] ABSTRACT

An elongated brace is provided having a first clamp pivotally supported from one end thereof and adapted to be semi-permanently attached to a frame bar of a bicycle and a second clamp is pivotally attached to the other end of the brace and may be releasably locked in clamped engagement with the aforementioned bicycle frame bar or a corresponding frame bar of an adjacent bicycle for support of the first and second mentioned bicycles from each other.

6 Claims, 5 Drawing Figures

BICYCLE HOLDER

BACKGROUND OF THE INVENTION

Various forms of locks have been provided for securing bicycles against theft and other devices have been provided for constituting bracing between adjacent bicycles. However, a convenient way of securing a bicycle against theft is to lock that bicycle to another bicycle, or more than two bicycles together. By utilizing such locking techniques, a convenient means for students and the like who arrive at and depart from a bicycle parking area at the same time is provided to insure against theft of the students' bicycles.

Examples of various forms of bicycle locks and braces for utilization between adjacent bicycles are disclosed in U.S. Pat. Nos. 442,275, 2,248,223, 3,138,260 and 3,917,138.

BRIEF DESCRIPTION OF THE INVENTION

The bicycle holder of the instant invention may be utilized to releasably lock a bicycle against displacement from a horizontal or upstanding railing bar and, alternately, against displacement relative to an adjacent bicycle. The holder or lock includes an elongated brace having a first clamp pivotally supported from one end of the brace and including structure for semi-permanent attachment to a frame bar of the supporting bicycle. The other end of the brace has a second clamp pivotally supported therefrom adapted for releasable locked engagement with the same bar of the associated bicycle frame when the holder is not in use and a corresponding frame bar of an adjacent bicycle or a horizontal or upstanding railing member when the holder is being used to prevent theft of the associated bicycle.

The main object of this invention is to provide a bicycle holder which may be utilized in releasably locking a bicycle against displacement relative to an adjacent bicycle or a stationary upstanding or horizontal railing element and the like.

Another object of this invention, in accordance with the immediately preceding object, is to provide a bicycle holder or lock which may be conveniently stored in an inoperative condition on an associated bicycle.

Still another object of this invention is to provide an apparatus in accordance with the preceding objects and which may be used on different types of bicycles.

A further object of this invention is to provide a bicycle holder which may be utilized to effectively lock a pair of bicycles together against theft.

A final object of this invention to be specifically enumerated herein is to provide a bicycle holder in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
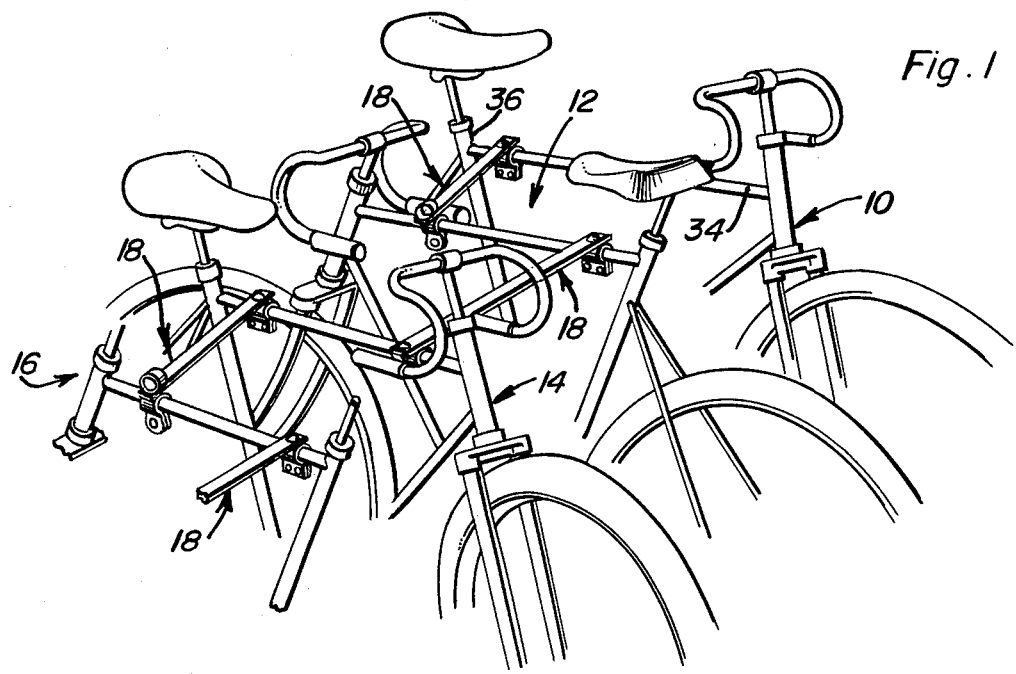
FIG. 1 is a fragmentary perspective view of a row of side-by-side bicycles with a plurality of the bicycle holders of the instant invention being utilized to releasably lock the row of bicycles together in upright positions.
Figure 2:
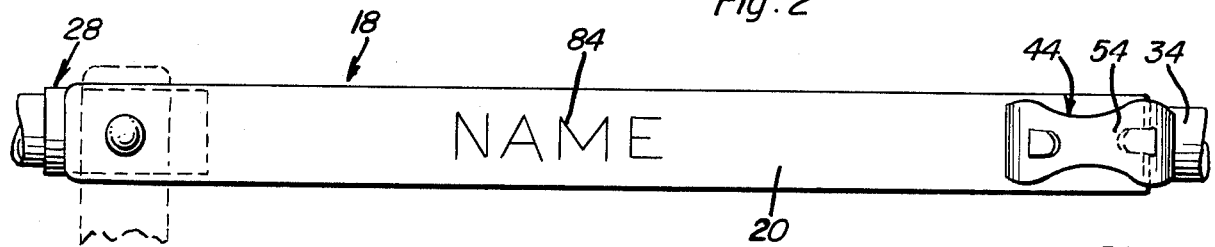
FIG. 2 is an enlarged top plan view of a holder constructed in accordance with the present invention and with the holder mounted upon a bicycle frame bar which is fragmentarily illustrated.

Referring now more specifically to the drawings and more specifically to FIG. 1, a row of side-by-side bicycles are referred to in general by the reference numerals 10, 12, 14 and 16. Each of the bicycles is equipped with a bicycle holder constructed in accordance with the present invention and referred to in general by the reference numeral 18.

Each of the holders 18 is constructed in the same manner. Accordingly, only one of the holders will be described in detail herein.

With reference now more specifically to FIGS. 2 through 5 of the drawings, the holder 18 includes an elongated brace 20 including first and second ends 22 and 24. The ends 22 and 24 have bores 26 formed therethrough and a first clamp assembly referred to in general by the reference numeral 28 includes a headed shank portion 30 by which the clamp 28 is pivotally supported from the brace 20. The shank portion 30 is rotatably received through the bore 26 formed in the end 22 of the brace 20.

The clamp 28 defines a split clamp body 32 secured about the upper horizontal bar 34 of the frame 36 of the bicycle 10. Removable fasteners 38 are secured through parallel mounting ears 40 of the split clamp body 32 and the ears 40 are provided with large diameter registered apertures 42 in addition to registered apertures (not shown) through which the fasteners 38 are secured.

A second clamp assembly is generally referred to by the reference numeral 44 and defines a split clamp body 46 including pairs of parallel ears 48 corresponding to the ears 40 and provided with registered apertures 50 corresponding to the apertures 42. The split clamp body 46 includes a shank portion 52 projecting outwardly therefrom and the outer end of the shank portion 52 includes a sleeve portion 54.

The shank portion 52 of the clamp assembly 44 is rotatably received through the bore 26 formed in the end 24 of the brace or bar 20 and accordingly, the clamp assembly 44 is pivotally supported from the corresponding end of the brace 20.

Figure 3:
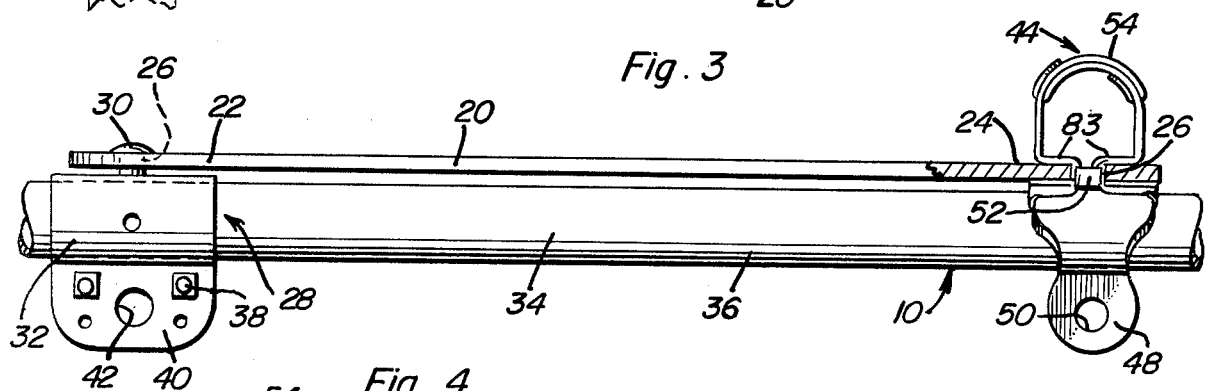
FIG. 3 is a side elevational view of the assemblage illustrated in FIG. 2 and with portions of the holder being broken away and illustrated in vertical section.
Figure 4:
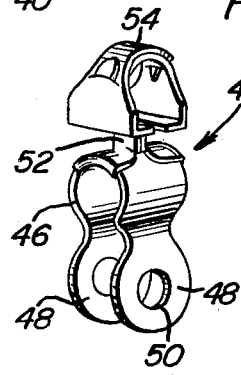
FIG. 4 is a perspective view of one of the clamp assemblies of the holder of the instant invention.

In operation, and assuming the holder 18 is supported from the frame bar 34 of the bicycle 10 in the manner illustrated in FIG. 3 of the drawings, when it is desired to lock the bicycle 10 relative to the bicycle 12, the sleeve portion or lifting eye 54 of the clamp assembly 44 may be engaged and pulled upwardly so as to disengage the split clamp body 46 of the clamp 44 from the bar 34. Thereafter, the brace 20 is swung about the shank portion 30 until the split clamp body 46 is registered with the frame bar 36 of the adjacent bicycle 12. Thereafter, the split clamp body 46 is pushed into engagement with the bar 34 of the bicycle 12 and a locking cable or lock hasp may be passed through the apertures 50 in the ears 48 of the split clamp body 46 in order to lock the clamp assembly 44 in engagement with the bar 34 of the frame of the bicycle 12. Accordingly, the bicycles 10 and 12 will be locked together against displacement away from each other. Of course, the holder 18 supported from the bicycle 12 may be utilized to lock the latter relative to the bicycle 14 in the same manner and the holder 18 supported from the bicycle 14 may be utilized to lock the bicycles 14 and 16 against displacement away from each other.

Figure 5:
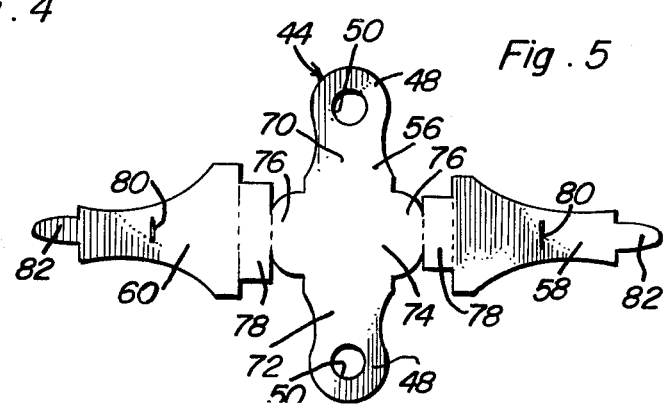
FIG. 5 is a plan view of a blank from which the clamp assembly illustrated in FIG. 5 may be formed.

With attention now invited more specifically to FIG. 5 of the drawings, it may be seen that the clamp assembly 44 may be readily constructed from a blank 56 constructed of metal. The blank 56 includes opposite end portions 58 and 60 as well as opposite side apertured portions 70 and 72. From a comparison of FIGS. 4 and 5 it may be seen that the center portion 74 of the blank 56 and the opposite side portions 70 and 72 may be bent in order to form the split clamp body 46 including the ears 48. Thereafter, the portions 76 of the blank 56 are bent back over the outer surfaces of the opposite ends of the split clamp body 46 and the portions 78 of the blank 56 disposed between the portions 76 and the end portions 58 and 60 may be bent into overlapped split cylindrical portions defining the shank portion 52. Thereafter, the end portions 58 and 60, slotted at 80 and provided with free end tongues 82, may be bent to form overlapping halves of the lifting eye 54, flattened as at 83 to closely overlie the upper surface of brace 20, with the tongue 82 of each end portion being received through the slot 80 of the other end portion. In this manner, the clamp assembly 44 may be readily constructed from a single blank of material.

The brace 20 of the holder 18 may be variously painted and may be provided with indicia 84 indicating the name of the owner of the associated bicycle.

As hereinbefore set forth, although the holder 18 is primarily designed to interconnect a pair of bicycles against displacement away from each other, the holder 18 of a given bicycle may have the clamp assembly 44 thereof secured about a horizontal or upstanding railing member or other suitable permanently mounted structure in order to lock the associated bicycle relative to that structure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A bicycle holder for support from a bicycle frame and locking and supporting the frame relative to a frame bar of a second bicycle frame or other similar object, said holder including an elongated brace, a mount pivotally supported from one end of said brace for relative angular displacement about a first axis extending transversely relative to said brace, said mount including structure for at least semi-permanent attachment to a frame bar of a first bicycle, an anchor, means pivotally supporting said anchor from the second end of said brace for relative angular displacement about a second axis extending transversely of said brace, said anchor including engaging means adapted to engage and to be locked against displacement away from an elongated member such as a frame bar of a second bicycle and to also releasably engage and be releasably supported from said frame bar of said first bicycle, said anchor including a split, generally cylindrical clamp having opposing generally semi-cylindrical spring jaws for releasable clamped engagement with a cylindrical member, said anchor including an integral finger-engageable eye member to facilitate manual withdrawal of said anchor from clamped engagement with a frame bar engaged thereby.

2. The combination of claim 1 wherein said spring jaws include side by side free end extensions provided with registered apertures formed therethrough through which a locking cable, chain or lock hasp may be lockingly secured.

3. The combination of claim 1 wherein said brace comprises a flat stock bar member.

4. A bicycle holder for support from a bicycle frame and locking and supporting the frame relative to a frame bar of a second bicycle frame or other similar object, said holder including an elongated brace, a mount pivotally supported from one end of said brace for relative angular displacement about a first axis extending transversely relative to said brace, said mount including structure for at least semi-permanent attachment to a frame bar of a first bicycle, an anchor, means pivotally supporting said anchor from the second end of said brace for relative angular displacement about a second axis extending transversely of said brace, said anchor including engaging means adapted to engage and to be locked against displacement away from an elongated member such as a frame bar of a second bicycle and to also releasably engage and be releasably supported from said frame bar of said first bicycle, said anchor including a split, generally cylindrical clamp having opposing generally semi-cylindrical spring jaws for releasable clamped engagement with a cylindrical member, said spring jaws including side-by-side free end extensions provided with registered apertures formed therethrough through which a locking cable, chain or lock hasp may be lockingly secured, said anchor being constructed from a generally cruciform blank including first and second pairs of remote short and long arms, said first pair of arms being bent into shape to define said spring jaws, said anchor including an integral finger-engageable eye member, said second pair of arms being bent into end overlapped engagement with each other to define said integral eye member.

5. In combination with a bicycle of the type including a generally cylindrical frame bar, a holder for support from said bar and locking and supporting said bar relative to a similar frame bar of a second bicycle, said holder including an elongated brace, a mount pivotally supported from one end of said brace for relative angular displacement about a first axis transverse to said brace, said mount being at least semi-permanently attached to said bar of the first-mentioned bicycle, an anchor, means pivotally supporting said anchor from the second end of said brace for relative angular displacement about a second axis transverse to said brace, said anchor including means releasably supported from said bar of the first-mentioned bicycle and adapted to engage and be locked against displacement away from a frame bar of said second bicycle when the latter is disposed alongside the first-mentioned bicycle, said anchor comprising a split, generally semi-cylindrical clamp having opposing generally semi-cylindrical spring jaws for releasable clamped engagement with said frame bar of said second bicycle, said spring jaws including side-by-side free end extensions provided with registered apertures formed therethrough through which a locking cable, chain or hasp may be lockingly secured, said anchor including an integral finger-engageable eye member to facilitate manual withdrawal of said anchor means from clamped engagement with a frame bar engaged thereby.

6. The combination of claim 5 wherein said anchor is constructed from a generally cruciform blank including first and second pairs of remote short and long arms, said first pair of arms being bent into shape to define said spring jaws, said second pair of arms being bent into end overlapped engagement with each other to define said integral finger-engageable eye member.

* * * * *